(12) United States Patent
Dai et al.

(10) Patent No.: US 10,268,787 B2
(45) Date of Patent: Apr. 23, 2019

(54) HYBRID TIMING ANALYSIS METHOD AND ASSOCIATED SYSTEM AND NON-TRANSITORY COMPUTER READABLE MEDIUM

(71) Applicant: TAIWAN SEMICONDUCTOR MANUFACTURING COMPANY LTD., Hsinchu (TW)

(72) Inventors: Chun-Jiun Dai, Taichung (TW); Wei Min Chan, Taipei County (TW); Yen-Huei Chen, Hsinchu County (TW); Hung-Jen Liao, Hsin-Chu (TW); Jonathan Tsung-Yung Chang, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 15/651,714

(22) Filed: Jul. 17, 2017

(65) Prior Publication Data

US 2019/0018917 A1    Jan. 17, 2019

(51) Int. Cl.
*G06F 17/50* (2006.01)

(52) U.S. Cl.
CPC ...... *G06F 17/5031* (2013.01); *G06F 17/5068* (2013.01)

(58) Field of Classification Search
CPC .................. G06F 17/5031; G06F 17/5068
See application file for complete search history.

(56) References Cited

U.S. PATENT DOCUMENTS

| | | | | |
|---|---|---|---|---|
| 5,095,454 A * | 3/1992 | Huang | ........... | G06F 17/5031 |
| | | | | 703/19 |
| 5,768,159 A * | 6/1998 | Belkadi | ........ | G01R 31/318314 |
| | | | | 703/19 |
| 6,550,045 B1 * | 4/2003 | Lu | ............. | G06F 17/5045 |
| | | | | 716/114 |
| 6,658,635 B1 * | 12/2003 | Tanimoto | ....... | G06F 17/5031 |
| | | | | 716/108 |
| 6,694,464 B1 * | 2/2004 | Quayle | ........ | G01R 31/2853 |
| | | | | 714/725 |
| 6,701,474 B2 * | 3/2004 | Cooke | ........ | G01R 31/318342 |
| | | | | 714/724 |

(Continued)

*Primary Examiner* — Naum Levin
(74) *Attorney, Agent, or Firm* — WPAT, P.C., Intellectual Property Attorneys; Anthony King

(57) ABSTRACT

A hybrid timing analysis method includes: receiving a pre-layout netlist, a post-layout netlist and a configuration file associated with an integrated circuit design; generating a first measurement script and an input stimulus waveform file according to the configuration file; performing a first dynamic timing analysis upon the pre-layout netlist by using the first measurement script and the input stimulus waveform file to generate a pre-layout simulation result; identifying at least one data path and at least one clock path according to the pre-layout simulation result; generating a second measurement script according to the at least on data path and at least one clock path; and performing a second dynamic timing analysis upon the post-layout netlist by using the second measurement script and the input stimulus waveform file to generate a first post-layout simulation result. Associated system and non-transitory computer readable medium are also provided.

20 Claims, 5 Drawing Sheets

(56) References Cited

U.S. PATENT DOCUMENTS

| | | | | |
|---|---|---|---|---|
| 7,073,153 B2 * | 7/2006 | Ikeda | ............ | G06F 17/5022 |
| | | | | 716/113 |
| 7,340,700 B2 * | 3/2008 | Emerson | ......... | G01R 31/31704 |
| | | | | 716/111 |
| 7,546,500 B2 * | 6/2009 | Kapur | ............ | G01R 31/31725 |
| | | | | 714/724 |
| 7,702,009 B2 * | 4/2010 | Akimoto | ......... | G01R 31/31709 |
| | | | | 375/226 |
| 9,727,676 B1 * | 8/2017 | Saurabh | ............ | G06F 17/5031 |

* cited by examiner

HYBRID TIMING ANALYSIS METHOD AND ASSOCIATED SYSTEM AND NON-TRANSITORY COMPUTER READABLE MEDIUM

BACKGROUND

Integrated circuit design systems implement processes that often include generating a circuit schematic of an integrated circuit being designed, performing a pre-layout simulation on the circuit schematic to simulate a performance of the integrated circuit, generating a layout of the integrated circuit, and performing a post-layout simulation on the layout of the integrated circuit. Prior art techniques for the pre-layout and post-layout simulation are commonly referred to as dynamic timing analysis or static timing analysis (STA). Each way has its drawbacks and there is a need for a novel solution in this field.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. Specifically, dimensions of the various features may be arbitrarily increased or reduced for clarity of discussion.

DETAILED DESCRIPTION

Figure 1:
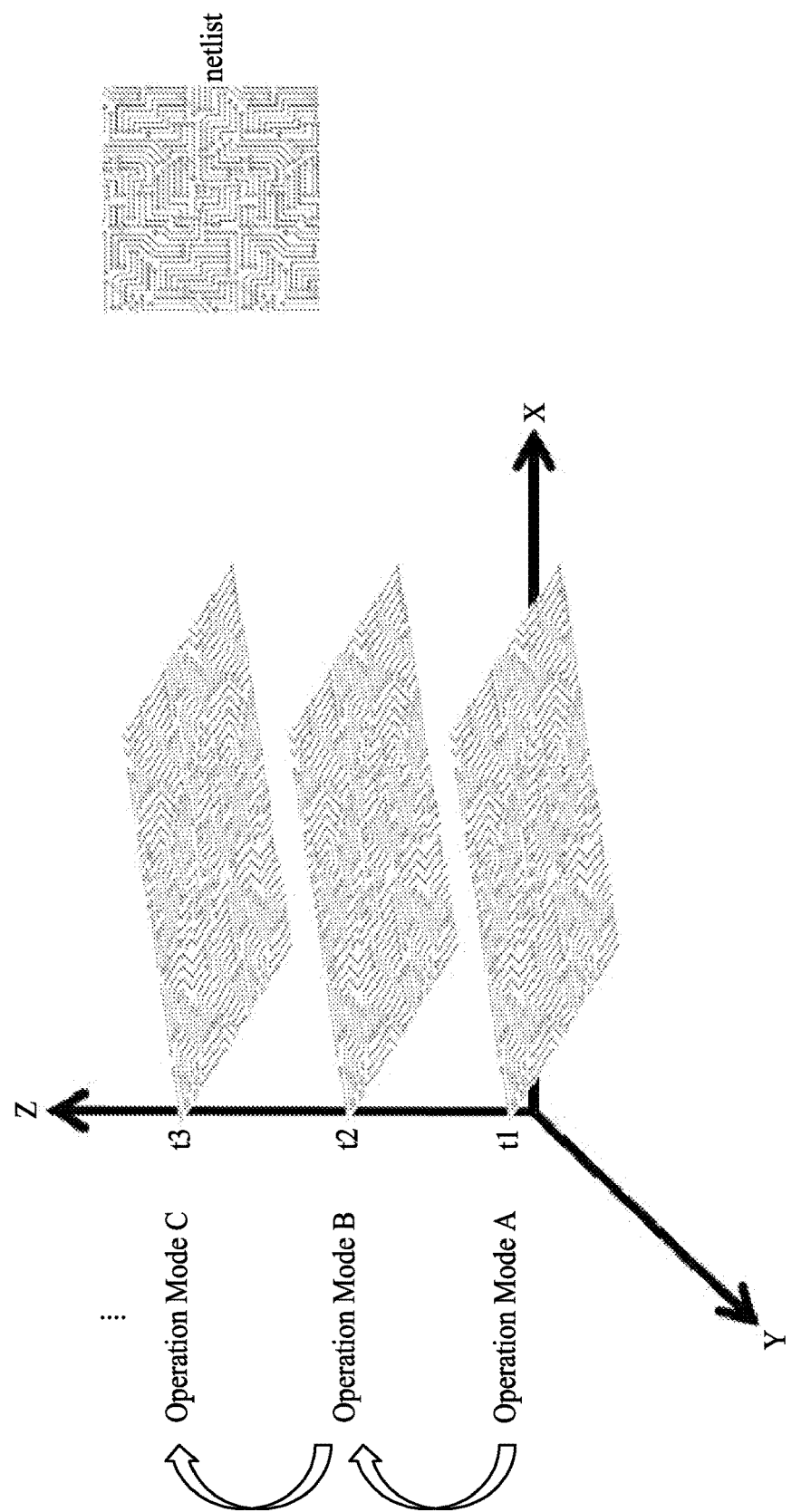
FIG. 1 is a diagram illustrating a concept of the hybrid timing analysis method of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments and configurations discussed.

Further, spatially relative terms, such as "beneath," "below," "lower," "above," "upper" and the like, may be used herein for ease of description to describe one element or feature's relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating or working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

In an integrated circuit design process, a circuit schematic of an integrated circuit being designed is generated first, for example, in a schematic editor. A pre-layout simulation is performed on the circuit schematic to simulate the performance of the integrated circuit. Since a layout of the integrated circuit has not yet been created at the time the pre-layout simulation is performed, layout-dependent effects (LDEs) of the layout of the integrated circuit cannot be taken into account in the pre-layout simulation. Instead, in the pre-layout simulation, default values of the LDEs are assumed.

Following the pre-layout simulation, a layout of the integrated circuit is generated. Design verification is then performed on the layout. The design verification typically includes an LDE parameter extraction, for example.

A post-layout simulation is then performed on the layout. In the post-layout simulation, the LDEs are taken into account, so that the generated circuit performance parameters reflect the actual circuit more accurately. The circuit performance parameters are then compared with the design specification. If the circuit performance parameters meet the requirements of the design specification, the design is approved. Otherwise, the design process reverts back to the schematic generation and editing steps, and the steps including the pre-layout simulation, the layout creation, the design verification, and the post-layout simulation are repeated to modify the design. The entire process is repeated until the circuit performance parameters meet the requirements of the design specification.

The timing analysis for performing the pre-layout and post-layout simulation may be either static or dynamic. Dynamic timing analysis tools provide the most detailed and accurate information obtainable concerning the performance of a circuit being simulated. This type of timing analysis is often generated through simulation of a circuit model by simulation programs which operate at the transistor level.

Examples of such circuit simulation programs are SPICE by University of California at Berkeley and ASTAP by IBM Corporation. These dynamic timing analysis programs typically operate by solving matrix equations relating to the circuit parameters such as voltages, currents, and resistances. Additionally, such circuit simulation approaches for performance analysis are pattern dependent, or stated another way, the possible paths and the delays associated therewith depend upon a state of a controlling mechanism or machine of the circuit. Thus, the result of a dynamic timing analysis depends on the particular test pattern, or vector, applied to the circuit.

However, the dynamic timing analysis tools require complicated manual works including a measurement script for indicating timing check nets and at least one input stimulus waveform file for generating at least one pattern. If the design changes, all of the manual works may need reconfirmation before repeating the dynamic timing analysis.

Static timing analysis tools are also widely used to predict the performance of VLSI designs. Static timing analysis tools are often used on very large designs for which exhaustive dynamic timing analysis is impossible or impractical due to the number of patterns required to perform the analysis. In static timing analysis, it is assumed that each signal being analyzed switches independently in each cycle of the state machine controlling that circuit. Furthermore, in static timing analysis, only the best and worst possible rising and falling times are computed for each signal in the circuit. The best and worst possible rising and falling times are typically determined in a single pass through a topologically sorted circuit. When referring to a topologically sorted circuit, it should be noted that a signal time associated with each point in the circuit being tested is determined in a sequential nature. Therefore, the signal time associated with the input of a first subcircuit whose output will be propagated to the input of a second subcircuit must be determined before the signal time associated with the input of the second subcircuit is calculated.

However, the static timing analysis may take some situations that never happen in reality into account and therefore generate over pessimistic results. The static timing analysis is hard to deal with designs including complex clock networks like self-time circuit due to the nature of stage by stage methodology of the static timing analysis. When multiple possible paths exist, the static timing analysis cannot determine whether there exists a false path. In addition, the static timing analysis can only simulate one operation mode at one simulation sequence. When there are several operation modes need to be simulated, several corresponding simulation sequences are required to be performed separately.

The present disclosure provides a hybrid timing analysis method that combines the dynamic timing analysis and the static timing analysis. In particular, the hybrid timing analysis method preserves advantages and precludes undesired drawbacks of the both. The hybrid timing analysis method may be applied to full custom designs.

FIG. 1 is a diagram illustrating a concept of the hybrid timing analysis method of the present disclosure. A 3D spatial coordinate is applied here in order to facilitate understanding. An X-axis of the 3D spatial coordinate may be representative of a characteristic of the dynamic timing analysis associated with high accuracy. A Y-axis of the 3D spatial coordinate may be representative of a characteristic of the static timing analysis associated with static stage based path traversing. A Z-axis of the 3D spatial coordinate may be representative of another characteristic of the dynamic timing analysis associated with time slices. Stated another way, the hybrid timing analysis method has features of high accuracy coming from the dynamic timing analysis and static stage based path traversing coming from the static timing analysis. In addition, the hybrid timing analysis method can also support different operation modes in a simulation sequence performed upon a design netlist, and such a feature is also coming from the dynamic timing analysis. For example, at timepoint t1, the simulation sequence is configured to allow a netlist to operate under an operation mode A; and at timepoint t2, the simulation sequence is configured to allow the netlist to operate under an operation mode B; and at timepoint t3, the simulation sequence is configured to allow the netlist to operate under an operation mode C, and so on. As used herein, a "net" is a set of component input/output pins electrically connected to a common point without intervening circuit components. A "netlist" is the collection of one or more nets. The netlist fully describes the interconnections of all components in an ASIC design.

Figure 2:
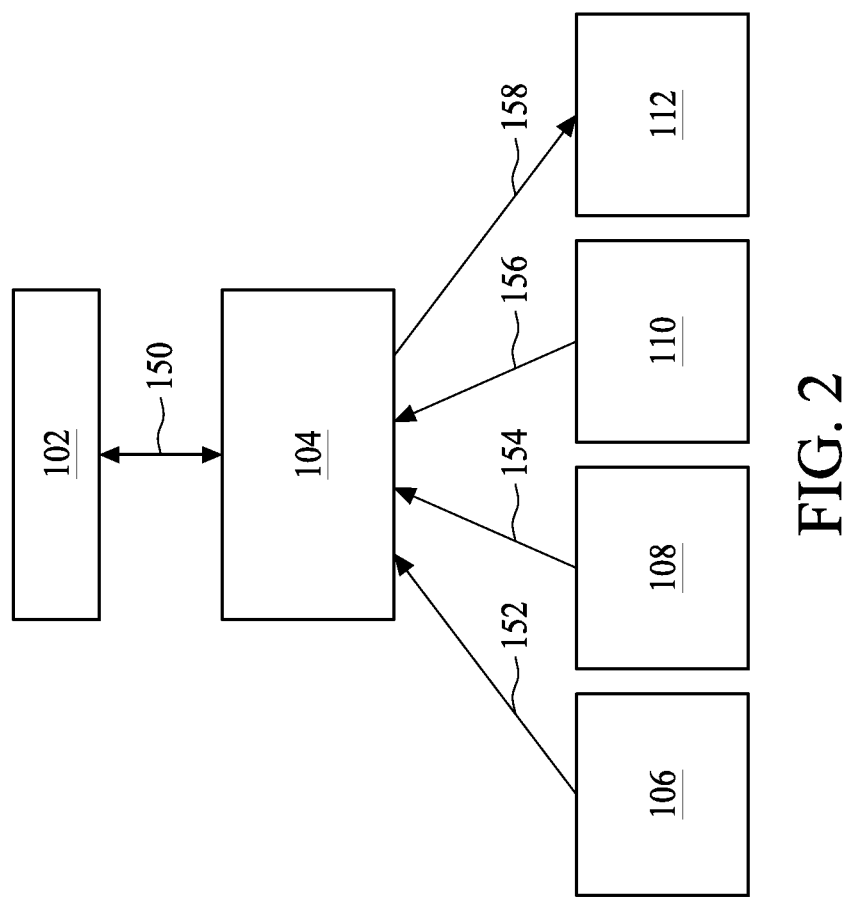
FIG. 2 is a diagram illustrating an exemplary computer aided engineering (CAE) design system which utilizes the hybrid timing analysis method in the design of application specific integrated circuits (ASICs) according to an embodiment of the present disclosure.

FIG. 2 is a diagram illustrating an exemplary computer aided engineering (CAE) design system 104 which utilizes the hybrid timing analysis method in the design of application specific integrated circuits (ASICs) according to an embodiment of the present disclosure. A user interacts with processes running on the CAE design system 104 through operation of interactive user interface 102 over bus 150. The CAE design system 104 receives information from mass storage subsystems 106, 108, and 110, such as random access memory (RAM) or other types of memory, over busses 152, 154, and 156 respectively. The information stored on the mass storage subsystem 106 includes at least one pre-layout netlist describing an ASIC design during design phases of the ASIC design before a layout process. The information stored on the mass storage subsystem 108 includes at least one post-layout netlist describing the ASIC design during design phases of the ASIC design after the layout process. The information stored on the mass storage subsystems 110 includes a configuration file defining a voltage or logical level of each input pin of the ASIC design at a plurality of cycles, i.e. timepoints.

Some input pins in a configuration file may be fixed to a certain level throughout the plurality of cycles. In contrast, some input pins in the configuration file may be activated to change their values during the plurality of cycles. The behavior of the input pins activated to change its value may be configured to toggle associated nets of the ASIC design that are desired to be verified. Those toggled nets may be referred to as active nets, and the nets that have never been toggled may be referred to as non-active nets. In order to allow all those nets need to be checked to become active nets, for example, to change its status from a low logical value to a high logical value and from the high logical value to the low logical value, pin values of associated input pins may be deliberately configured by the user. In some embodiments, combinations of pin values of some input pins may be arranged by an exhausted way. In some embodiments, the configuration file may also define a voltage or logical level of each output pin of the ASIC design at the plurality of cycles.

The CAE design system 104 outputs information to a mass storage subsystem 112 over a bus 158. The information generated by the CAE design system includes a timing analysis report that shows timing violations based on the hybrid timing analysis method. The generated timing analysis preserves the feature of the dynamic timing analysis by using the most detailed and accurate information obtainable concerning the performance of a circuit being simulated. At the same time, the generated timing analysis also eliminates false paths automatically. The user can use the timing analysis report directly to develop a plan to close timing for each timing violation identified without further manual judgement.

The CAE design system 104 is preferably a general purpose computer such as a graphical workstation with programs and processes running in a CPU (not shown) which exchanges information with the user to aid in the test of an ASIC design. It is to be understood that the CAE design system 104 and associated elements in FIG. 2 are intended only to broadly suggest an architecture of an ASIC design system which may embody the hybrid timing analysis method of the present disclosure. One skilled in the art will readily recognize that many different structures and organizations of cooperating processes and design tools, and many different organizations and structure of stored information may be used.

Figure 3A:
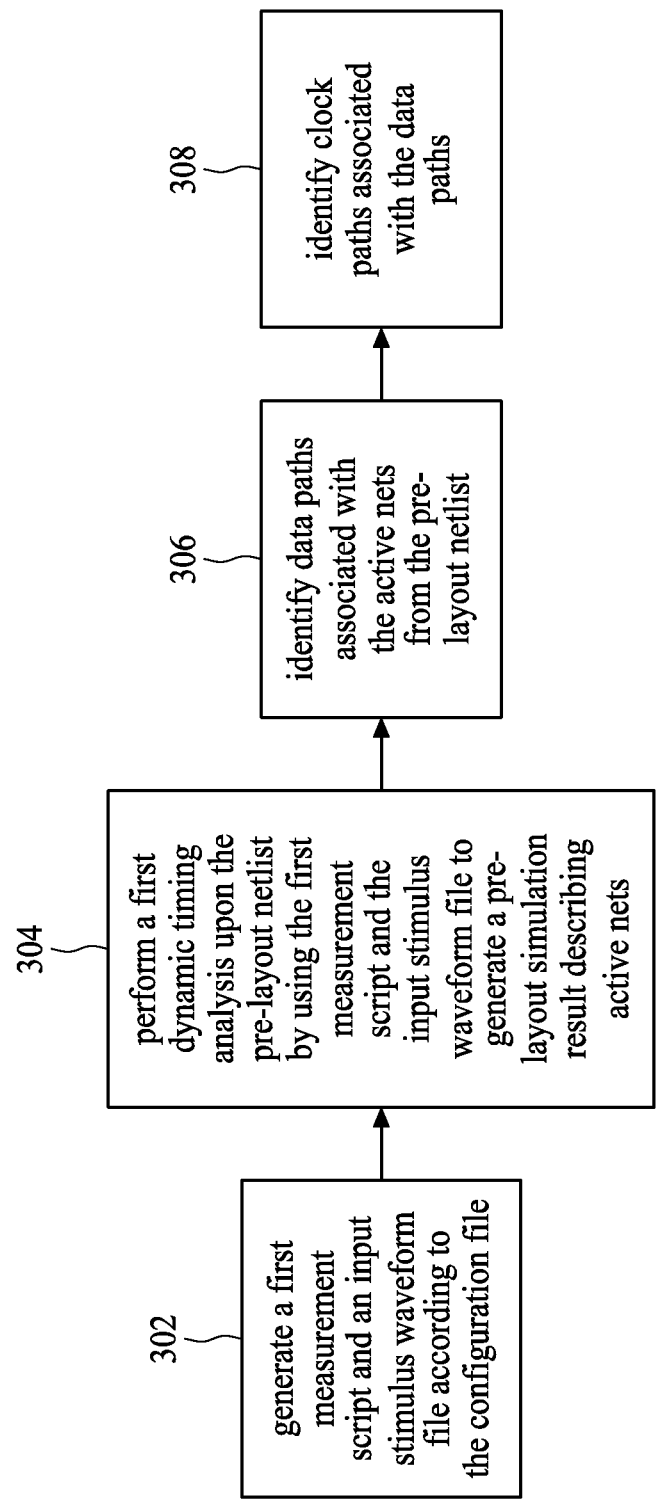
FIG. 3A and FIG. 3B are flow diagrams illustrating the hybrid timing analysis method according to an embodiment of the present disclosure.
Figure 3B:
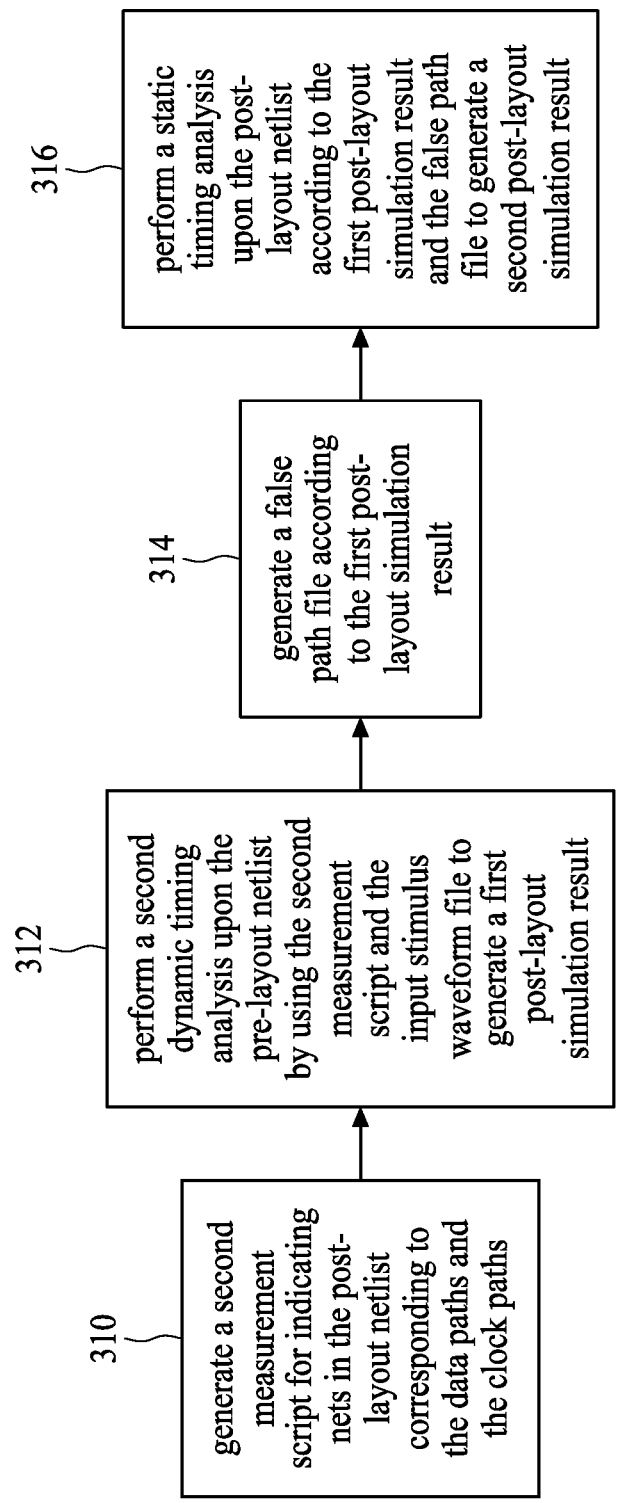

FIG. 3A and FIG. 3B are flow diagrams illustrating the hybrid timing analysis method according to an embodiment of the present disclosure. In FIG. 3A, an element 302 is operable to generate a first measurement script and at least one input stimulus waveform file for the dynamic timing analysis performed upon the pre-layout netlist stored in the mass storage subsystem 106 of FIG. 2 immediately following the element 302. The first measurement script is used for indicating timing check nets in the pre-layout netlist. The first measurement script generated in the element 302 includes all the nets in the pre-layout netlist, which means in this stage active nets are not yet identified out and all the nets in the pre-layout netlist are retrieved. Therefore the first measurement script includes the active nets and non-active nets. The at least one input stimulus waveform file is generated according to the configuration file stored in the mass storage subsystem 110. In particular, the at least one input stimulus waveform file may be transformed from voltage or logical levels of input pins defined in the configuration file. The input stimulus waveform file is used to validate and test the predetermined portion of the ASIC design that is desired to be verified. An expected simulation result may also be described in the input stimulus waveform file for ease of comparison with the simulation results.

Next, an element 304 subsequent to the element 302 is operable to perform a first dynamic timing analysis upon the pre-layout netlist by using the first measurement script and the at least one input stimulus waveform file obtained by the element 302. After the first dynamic timing analysis is accomplished, at least one pre-layout simulation result corresponding to the at least one input stimulus waveform file is obtained. In the pre-layout simulation result, behaviors of all the nets of the ASIC design are recorded cycle by cycle, including active nets and non-active nets.

Next, an element 306 subsequent to the element 304 is operable to locate data paths according to the pre-layout simulation result. To put it more specifically, the data paths associated with the active nets indicated in the pre-layout simulation result may be identified from the pre-layout netlist and recorded into a data path file. As used herein, a "data path" is a non-clock path. The data path may start from an input pin of the pre-layout netlist along subsequent active nets to a device that is activated or gated with a clock. On the other hand, the data path may start from a device activated or gated with a clock along subsequent active nets to an output pin of the pre-layout netlist. The data path may also start from a device activated or gated with a clock along subsequent active nets to another device that is activated or gated with the clock. Compared with the existing static timing analysis method, the data paths identified by referring to the active nets can help to filter out the data paths that are impractical or the user does not care according to the operation.

An element 308 is operable to locate clock paths according to the pre-layout simulation result. To put it more specifically, the clock paths associated with the data paths obtained by the element 306 according to the pre-layout simulation result may be identified from the pre-layout netlist and recorded into a clock path file. The clock path may start from an input pin of the pre-layout netlist to a device that is activated or gated with a clock. In some embodiments, the clock path may alternatively start from an internal pin of the pre-layout netlist to a device that is activated or gated with a clock.

Next, please refer to FIG. 3B. An element 310 subsequent to the elements 306 and 308 is operable to generate a second measurement script for indicating nets in the post-layout netlist corresponding to the data paths and the clock paths obtained in the elements 304-308. The second measurement script is for the following second dynamic timing analysis performed upon the post-layout netlist stored in the mass storage subsystem 108 of FIG. 2. Compared to the first measurement script, the second measurement script precludes non-active nets and the data paths and clock paths that are impractical or the user does not care according to the operation. Therefore, the second measurement script includes less net compared to the first measurement script. In some embodiments, the at least one input stimulus waveform file generated in the element 304 may be directly provided to the following second dynamic timing analysis performed upon the post-layout netlist.

Next, an element 312 subsequent to the element 310 is operable to perform a second dynamic timing analysis upon the post-layout netlist by using the second measurement script and the at least one input stimulus waveform file obtained by the element 302. After the second dynamic timing analysis is accomplished, at least one first post-layout simulation result corresponding to the at least one input stimulus waveform file is obtained. In the first post-layout simulation result, information of data path delay of each data path and clock path delay of each clock path accurately reflecting the actual circuit are computed and recorded in the post-layout simulation result. In particular, the information of data path delay of each data path further includes delay between neighboring nets along each data path.

Figure 4:
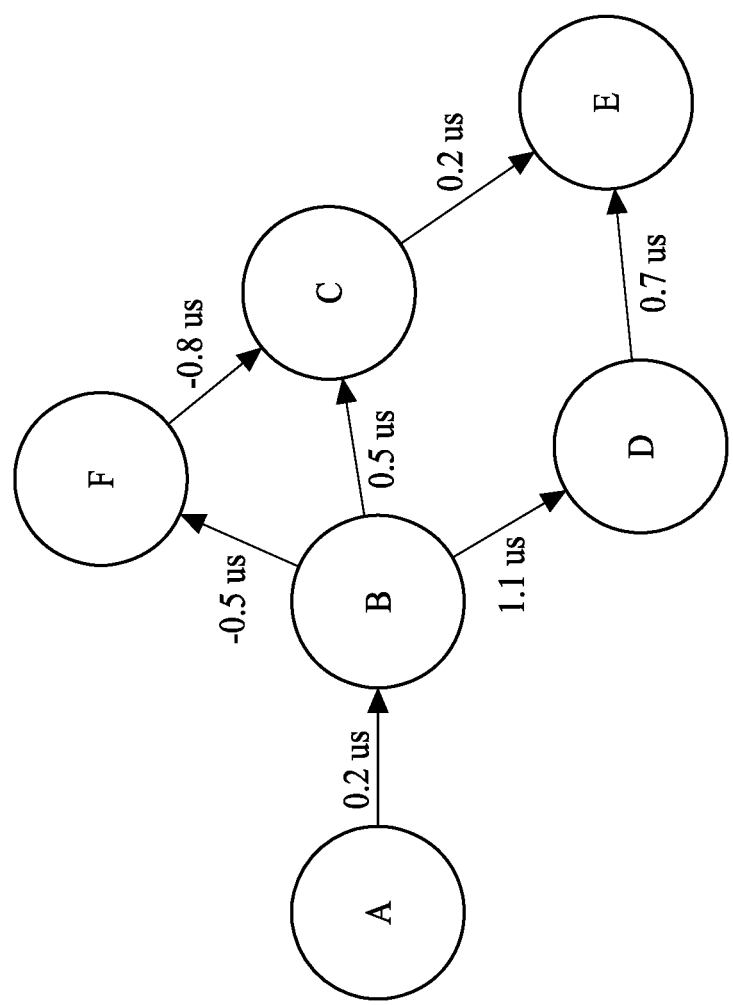
FIG. 4 is a diagram illustrating nets randomly picked from a first post-layout simulation result.

Next, an element 314 subsequent to the element 312 is operable to generate a false path file for indicating false path(s) in the post-layout netlist for the following static timing analysis performed upon the post-layout netlist. The false path file is obtained according to the first post-layout simulation result. As described above, the first post-layout simulation result produced by the second dynamic timing analysis includes information of data path delay of each data path and clock path delay of each clock path. For example, FIG. 4 shows nets A to F which are randomly picked from the first post-layout simulation result. Delays between neighboring nets are also obtained from the first post-layout simulation result. A normal delay should be a positive value. However, the delay between the nets B and F and the delay between the nets F and C are indicated as a negative value, i.e. −0.5 us and −0.8 us. This is because the second dynamic timing analysis tool summarizes the path from the net B to the net F to the C as a false path and never has a chance to happen according to the second measurement script and the input stimulus waveform file. Therefore, the path associated with negative delay can be simply collected and recorded into the false path file. In this way, the user does not need to manually prepare a file describing all the false paths he/she can think of. The false path file can be automatically generated in the element 314.

In the final stage, an element 316 is operable to perform a static timing analysis upon the post-layout netlist according to the first post-layout simulation result and the false path file to generate a second post-layout simulation result. Because the static timing analysis performed in the element 316 is based on the first post-layout simulation result instead of only the best and worst possible rising and falling delays, the second post-layout simulation result does not has the disadvantages that exist in the conventional static timing analysis results.

According to some embodiments, a non-transitory computer readable medium is also provided, where the non-transitory computer readable medium may stores a set of instructions. When the set of instructions is executed, for example, by a processor, this processor may perform operations according to a hybrid timing analysis method (e.g. the method of the embodiment shown in FIG. 3A to FIG. 3B). Thus, the set of instructions is arranged to instruct this processor to control the electronic device where the processor is positioned to operate according to the hybrid timing analysis method.

Some embodiment of the present disclosure provides a hybrid timing analysis method. The method includes: receiving a pre-layout netlist, a post-layout netlist and a configuration file associated with an integrated circuit design; generating a first measurement script and an input stimulus waveform file according to the configuration file; performing a first dynamic timing analysis upon the pre-layout netlist by using the first measurement script and the input stimulus waveform file to generate a pre-layout simulation result; identifying at least one data path and at least one clock path according to the pre-layout simulation result; generating a second measurement script according to the at least on data path and at least one clock path; and performing a second dynamic timing analysis upon the post-layout netlist by using the second measurement script and the input stimulus waveform file to generate a first post-layout simulation result.

Some embodiment of the present disclosure provides a system. The system includes: a computer aided engineering (CAE) design system for performing the hybrid timing analysis method of the above; a storage subsystem for storing a pre-layout netlist, a post-layout netlist and a configuration file associated with an integrated circuit design; and a first bus coupled between the CAE design system and the storage subsystem; wherein the CAE design system receives the pre-layout netlist, the post-layout netlist and the configuration file from the storage subsystem through the first bus.

Some embodiment of the present disclosure provides a non-transitory computer readable medium storing a set of instructions which when executed performs a hybrid timing analysis method. The hybrid timing analysis method includes: receiving a pre-layout netlist, a post-layout netlist and a configuration file associated with an integrated circuit design; generating a first measurement script and an input stimulus waveform file according to the configuration file; performing a first dynamic timing analysis upon the pre-layout netlist by using the first measurement script and the input stimulus waveform file to generate a pre-layout simulation result; identifying at least one data path and at least one clock path according to the pre-layout simulation result; generating a second measurement script according to the at least on data path and at least one clock path; and performing a second dynamic timing analysis upon the post-layout netlist by using the second measurement script and the input stimulus waveform file to generate a first post-layout simulation result.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hybrid timing analysis method, comprising:
receiving a pre-layout netlist, a post-layout netlist and a configuration file associated with an integrated circuit design;
generating a first measurement script and an input stimulus waveform file according to the configuration file;
performing a first dynamic timing analysis upon the pre-layout netlist by using the first measurement script and the input stimulus waveform file to generate a pre-layout simulation result;
identifying at least one data path and at least one clock path according to the pre-layout simulation result;
generating a second measurement script according to the at least on data path and at least one clock path;
performing a second dynamic timing analysis upon the post-layout netlist by using the second measurement script and the input stimulus waveform file to generate a first post-layout simulation result; and
fabricating a semiconductor chip according to the post-layout netlist and the first post-layout simulation result.

2. The hybrid timing analysis method of claim 1, further comprising:
generating a false path file according to the first post-layout simulation result.

3. The hybrid timing analysis method of claim 2, further comprising:
performing a static timing analysis upon the post-layout netlist according to the first post-layout simulation result and the false path file to generate a second post-layout simulation result.

4. The hybrid timing analysis method of claim 2, wherein the first post-layout simulation result comprises delay information between neighboring nets along each data path.

5. The hybrid timing analysis method of claim 4, wherein the generation of the false path file according to the first post-layout simulation result comprises:
   when the delay information indicates a negative value, identifying the data path associated with the delay information as a false path recording the false path in the false path file.

6. The hybrid timing analysis method of claim 1, wherein the receiving of the configuration file comprises:
   receiving the configuration file including a logical level of each input pin of the integrated circuit design at a plurality of cycles.

7. The hybrid timing analysis method of claim 1, wherein the generation of the first measurement script comprises:
   generating the first measurement script including all nets in the pre-layout netlist.

8. The hybrid timing analysis method of claim 1, wherein the generation of the pre-layout simulation result comprises:
   generating the pre-layout simulation result including active nets and non-active nets.

9. The hybrid timing analysis method of claim 8, wherein the identification of the at least one data path according to the pre-layout simulation result comprises:
   identifying the at least one data path associated with the active nets.

10. The hybrid timing analysis method of claim 9, wherein the identification of the at least one clock path according to the pre-layout simulation result comprises:
    identifying the at least one clock path associated with the at least one data path.

11. The hybrid timing analysis method of claim 1, wherein the generation of the second measurement script comprises:
    generating the second measurement script for indicating a plurality of nets in the post-layout netlist corresponding to the data path and the clock path.

12. The hybrid timing analysis method of claim 11, wherein the plurality of nets indicated in the second measurement script is less than the nets included in the first measurement script.

13. A system, comprising:
    a computer aided engineering (CAE) design system for performing the hybrid timing analysis method of claim 1;
    a storage subsystem for storing a pre-layout netlist, a post-layout netlist and a configuration file associated with an integrated circuit design; and
    a first bus coupled between the CAE design system and the storage subsystem;
    wherein the CAE design system receives the pre-layout netlist, the post-layout netlist and the configuration file from the storage subsystem through the first bus.

14. The system of claim 13, further comprising:
    an interactive user interface; and
    a second bus coupled between the CAE design system and the interactive user interface.

15. A non-transitory computer readable medium storing a set of instructions which when executed performs a hybrid timing analysis method, the hybrid timing analysis method comprising:
    receiving a pre-layout netlist, a post-layout netlist and a configuration file associated with an integrated circuit design;
    generating a first measurement script and an input stimulus waveform file according to the configuration file;
    performing a first dynamic timing analysis upon the pre-layout netlist by using the first measurement script and the input stimulus waveform file to generate a pre-layout simulation result;
    identifying at least one data path and at least one clock path according to the pre-layout simulation result;
    generating a second measurement script according to the at least on data path and at least one clock path;
    performing a second dynamic timing analysis upon the post-layout netlist by using the second measurement script and the input stimulus waveform file to generate a first post-layout simulation result; and
    fabricating a semiconductor chip according to the post-layout netlist and the first post-layout simulation result.

16. The non-transitory computer readable medium of claim 15, wherein the hybrid timing analysis method further comprises:
    generating a false path file according to the first post-layout simulation result.

17. The non-transitory computer readable medium of claim 16, wherein the hybrid timing analysis method further comprises:
    performing a static timing analysis upon the post-layout netlist according to the first post-layout simulation result and the false path file to generate a second post-layout simulation result.

18. The non-transitory computer readable medium of claim 15, wherein the receiving of the configuration file comprises:
    receiving the configuration file including a logical level of each input pin of the integrated circuit design at a plurality of cycles.

19. The non-transitory computer readable medium of claim 15, wherein the generation of the first measurement script comprises:
    generating the first measurement script including all nets in the pre-layout netlist.

20. The non-transitory computer readable medium of claim 15, the generation of the pre-layout simulation result comprises:
    generating the pre-layout simulation result including active nets and non-active nets.

* * * * *